US007352856B2

(12) United States Patent
Matsuhashi et al.

(10) Patent No.: US 7,352,856 B2
(45) Date of Patent: Apr. 1, 2008

(54) TELEPHONE APPLICABLE TO PSTN AND IP NETWORK AND CALL CONNECTION CONTROL METHOD

(75) Inventors: Satoshi Matsuhashi, Yokohama (JP); Toshiyuki Matsuda, Yokohama (JP); Kouichi Shimizu, Chigasaki (JP); Taro Ogawa, Kamakura (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 755 days.

(21) Appl. No.: 10/635,552

(22) Filed: Aug. 7, 2003

(65) Prior Publication Data

US 2005/0025294 A1    Feb. 3, 2005

(30) Foreign Application Priority Data

Apr. 28, 2003    (JP)    ............................. 2003-123632

(51) Int. Cl.
  *H04M 9/06*    (2006.01)
(52) U.S. Cl. .............................. 379/387.02; 379/88.17; 379/93.01; 370/352
(58) Field of Classification Search ............ 379/88.17, 379/93.01, 387.02; 455/411; 370/352
See application file for complete search history.

(56) References Cited

U.S. PATENT DOCUMENTS 6,954,632 B2 * 10/2005 Kobayashi ................... 455/411
2003/0002637 A1 *  1/2003 Miyauchi et al. ......... 379/93.01

FOREIGN PATENT DOCUMENTS

JP            10-257171           9/1998

* cited by examiner

*Primary Examiner*—Gerald Gauthier
(74) *Attorney, Agent, or Firm*—Mattingly, Stanger, Malur & Brundidge, P.C.

(57) ABSTRACT

A telephone applicable to PSTN and IP network having functions of obtaining, when a call is originated by entering a PSTN telephone number, an IP network telephone number of a destination telephone corresponding to the PSTN telephone number from a telephone number translation server connected to the IP network, obtaining IP address information of the destination telephone corresponding to the IP network telephone number from a call agent connected to the IP network, establishing call connection with the destination telephone via the IP network by using the IP address information, and establishing call connection with the destination telephone via the PSTN if the IP network telephone number of the destination telephone cannot be obtained from the telephone number translation server.

5 Claims, 11 Drawing Sheets

FIG. 3

TELEPHONE NUMBER TRANSLATION DATABASE 40

| PSTN TELEPHONE NUMBER 41 | IP NETWORK TELEPHONE NUMBER 42 | HOLD TIME 43 |
|---|---|---|
| 03-9012-3456 | 050-789-0123 | 10:00:00 |
| 03-5678-9012 | 050-345-6789 | 2:30:00 |
| ... | ... | ... |
| 044-234-5678 | 050-901-2345 | 6:10:30 |
| ... | ... | ... |
| 045-123-4567 | 050-890-1234 | 4:50:20 |
| ... | ... | ... |

CACHE TABLE 20

| PRIORITY 21 | PSTN TEL NO. 22 | IP NETWORK TEL NO. 23 | THE LAST CALLING TIME 24 | TOTAL NUMBER OF CALLS 25 | AVERAGE CALL INTERVAL 26 | |
|---|---|---|---|---|---|---|
| 1 | 045-123-4567 | 050-890-1234 | 2000/1/10 10:30:30 | 10 | 20:10:00 | EN-1 |
| 2 | 044-234-5678 | 050-901-2345 | 2000/1/9 8:40:00 | 1 | 25:40:00 | EN-2 |
| 3 | 03-9012-3456 | 050-789-0123 | 2000/1/9 18:30:00 | 3 | 26:10:00 | ... |
| ... | ... | ... | ... | ... | ... | |
| k-1 | 0467-567-8901 | — | 2000/1/10 11:00:00 | 1 | 300:00:00 | |
| k | 03-5678-9012 | 050-345-6789 | 2000/1/10 11:30:00 | 3 | 320:10:00 | EN-k |

TELEPHONE APPLICABLE TO PSTN AND IP NETWORK AND CALL CONNECTION CONTROL METHOD

BACKGROUND OF THE INVENTION (1) Field of the Invention

The present invention relates to IP (Internet Protocol) telephony systems. More particularly, the invention relates to a high functionality telephone and a call connection control method capable of selectively connecting a call originated by entering a telephone number for a Public Switched Telephone Network (PSTN) subscriber through an IP telephone network.

(2) Description of the Related Art

With the development of IP technology, Internet service providers started IP telephony services as one service content. Due to the cost effectiveness of IP telephony (Voice over IP: VoIP), lower telephone charges than conventional PSTN telephony, there is a steep rise in the number of IP telephony users. As the IP telephony comes into popular use, a telephone numbering scheme ("050" numbers) has been fixed for the IP telephony. In the current situation, new IP network telephone numbers are assigned to the telephones of IP telephony service subscribers in addition to the conventional PSTN telephone numbers.

As one of prior art approaches for making a telephone usable in two telephony systems based on different telephone numbering schemes, for example, in Japanese Published Unexamined Patent Publication No. Hei 11-257171 (Japanese Patent Document 1), a CATV telephony system which made a telephone applicable to both a public telephone network and a CATV telephone network has been proposed.

According to the Japanese Patent Document 1, when a CATV telephone service subscriber originates a call, the call is routed to a switch on the CATV telephone network if the destination telephone number is any number other than special numbers such as "100," "199," "0120," and international telephone numbers. The switch on the CATV telephone network has a telephone number translation database for translating public telephone network subscriber numbers (hereinafter referred to as PSTN telephone numbers) to CATV subscriber telephone numbers. If the destination telephone number is a PSTN telephone number, the switch searches the telephone number translation database for a CATV telephone number corresponding to the above destination PSTN telephone number. If the CATV telephone number is found, the switch performs call connection on the CATV telephone network, using the CATV telephone number. If not, the switch routes the call to the PSTN network.

While PSTN telephone numbers are made open to the public by a telephone directory or the like, IP network telephone numbers are not known by a caller, unless an IP telephone user makes its number known to the public beforehand. Thus, IP telephone service subscribers cannot help calling each other using conventional PSTN telephone numbers, unless knowing the IP network telephone number of a called party. In this situation, a problem is presented that callers cannot enjoy the benefit of IP telephony, less telephone charges than the PSTN telephony. It is therefore desirable for IP telephone service subscribers that a call originated by entering a PSTN telephone number is automatically connected through the IP network to the called party if the destination telephone is also an IP telephone service subscriber. In order to satisfy this need, it is a challenge how to associate an entered PSTN telephone number with destination telephone's IP address information.

In an IP network that applied a gatekeeper, as a call control server (call agent), which executes, for example, a session control protocol standardized by ITU-T recommendation H.323, call connection between a caller telephone and a destination IP telephone is established by notifying from an IP telephone to the gatekeeper an IP network telephone number of the destination, and by returning destination address information such as an IP address corresponding to the above IP network telephone number from the gatekeeper to the caller telephone.

Unlike local networks such as the CATV network, the IP network is a large-scale network providing a wide range of services. Thus, it is desirable to establish call connection on the IP network for a call originated by entering a PSTN telephone number by making effective use of existing network resources and without altering the standardized call connection protocol run by the above gatekeeper.

In the telephony system disclosed in the Japanese Patent Document 1, IP network connection for special numbers is not taken into consideration, that is, a caller terminal which originates a call by entering a special number is connected to the PSTN. As for calls originated by entering a PSTN number other than special numbers, the switch on the CATV network always executes database search per call. When this system is assumed to be applied to the large-scale IP network, a vast database is required and this poses a problem of a low speed of call connection processing.

SUMMARY OF THE INVENTION

An object of the present invention is to provide a telephone applicable to PSTN and IP network and a call connection control method which made it possible to establish call connection via the IP network for calls originated by entering a PSTN telephone number.

Another object of the present invention is to provide a telephone applicable to PSTN and IP network and a call connection control method, making it possible to establish call connection rapidly via the IP network for calls originated by entering a PSTN telephone number.

A further another object of the present invention is to provide a telephone applicable to PSTN and IP network and a call connection control method which made it possible to establish call connection via the IP network for calls originated by entering a PSTN telephone number, utilizing existing call agents connected to the IP network.

To achieve the foregoing objects, a telephone applicable to a public switched telephone network (PSTN) and an IP network, according to the present invention, includes means for communicating with a telephone number translation server connected to the IP network when a call is originated by entering a PSTN telephone number and obtaining an IP network telephone number of a destination telephone corresponding to the PSTN telephone number, means for communicating with a call agent connected to the IP network to obtain IP address information of the destination telephone corresponding to the IP network telephone number, and establishing call connection with the destination telephone via the IP network by using the IP address information, and means for establishing call connection with the destination telephone via the PSTN if the IP network telephone number of the destination telephone corresponding to the above PSTN telephone number cannot be obtained from the telephone number translation server.

In a embodiment of the invention, the telephone includes a cache table for storing mappings between PSTN telephone numbers and IP network telephone numbers of telephones having been called before from the telephone. When a call is originated by entering a PSTN telephone number, the above means for obtaining the IP network telephone number searches the cache table for the IP network telephone number of the destination telephone corresponding to the entered PSTN telephone number. If the IP network telephone number of the destination telephone does not exist in the cache table, the telephone communicates with the telephone number translation server connected to the IP network. From the above call agent, the means for establishing call connection through the IP network obtains IP address information of the destination telephone corresponding to the IP network telephone number obtained from the cache table or the telephone number translation server.

In a preferred embodiment of the invention, the telephone includes means for generating a tone or guidance allowing for discrimination between the IP network and the PSTN through which the call is connected for users who may do not want call connection via the PSTN in view of cost.

One feature of the invention resides in that, when a new IP network telephone number is obtained from the telephone number translation server, a new entry of a mapping between the IP network telephone number and the corresponding PSTN telephone number is added to the cache table. Another feature of the invention resides in that the telephone includes means for communicating with the telephone number translation server and registering a mapping of the telephone's own PSTN telephone number and IP network telephone number to the server when the telephone is connected to the IP network.

In another embodiment of the invention, the telephone disclosed herein comprises a cache table for storing mappings between PSTN telephone numbers and unification identifiers of telephones having been called before from the telephone, means for searching the cache table, when a call is originated by entering a PSTN telephone number, for a unification identifier of a destination telephone corresponding to the entered PSTN telephone number, and, if the unification identifier of the destination telephone does not exist in the cache table, communicating with the telephone number translation server connected to the IP network and obtaining the unification identifier of the destination telephone corresponding to the above PSTN telephone number, means for requesting the call agent connected to the IP network to establish call connection with the destination telephone via the IP network, based on the unification identifier obtained from the cache table or the telephone number translation sever, and means for establishing call connection with the destination telephone via the PSTN if the unification identifier of the destination telephone cannot be obtained from the cache table and the telephone number translation server.

Because the telephone number translation server which manages telephone numbers in a wide-area network such as the IP network handles PSTN telephone numbers in such a telephone numbering format as "0"+"toll number"+"local exchange code"+"subscriber number," if the calling telephone user dials a PSTN telephone number consisting entirely of local exchange code and subscriber number, correct data base search cannot be performed by simply inquiring, with this PSTN telephone number, the telephone number translation server for a corresponding IP network telephone number, owing to different telephone numbering format. In view hereof, a further feature of the invention is that if the entered PSTN telephone number consists entirely of local exchange code and subscriber number, the means for obtaining the IP network telephone number converts the entered PSTN telephone number into a numbering format including a toll number prior to obtaining the IP network telephone number of the destination telephone.

A call control method in accordance with the present invention comprises the steps of: (A) communicating with the telephone number translation server connected to the IP network when a call is originated by entering a PSTN telephone number and obtaining an IP network telephone number of the destination telephone corresponding to the above PSTN telephone number; (B) obtaining IP address information of the destination telephone corresponding to the above IP network telephone number from a call agent connected to the IP network and establishing call connection between the calling telephone and the destination telephone via the IP network by using the IP address information; and (C) establishing call connection between the calling telephone and the destination telephone via the PSTN if the IP network telephone number of the destination telephone corresponding to the above PSTN telephone number cannot be obtained from the telephone number translation server.

The call connection control method in accordance with the invention further comprises the step of storing a mapping between the IP network telephone number obtained from the telephone number translation server and the PSTN telephone number into the cache table, wherein, when a call is originated by entering a PSTN telephone number, the cache table is searched for the IP network telephone number of the destination telephone corresponding to the entered PSTN telephone number and, if the IP network telephone number of the destination telephone exists in the cache table, the IP network telephone number is used, if not, the IP network telephone number of the destination telephone is obtained from the telephone number translation server.

The present invention constituted as described above makes IP call connection using PSTN telephone numbers feasible without altering existing IP telephone systems and adaptable to a special number service by IP telephony which is expected to begin in future. By storing the mappings of previously dialed PSTN telephone numbers and corresponding IP network telephone numbers in the cache table, when originating a call to the same destination number again, speedily call connection is achievable, skipping the inquiry to the telephone number translation server.

BRIEF DESCRIPTION OF THE DRAWINGS

FIG. 3 shows an example of a telephone number translation database held by a telephone number translation server 4.

FIG. 6 shows an example of a cache table 20 held by the intelligent telephone 1.

DESCRIPTION OF THE PREFERRED EMBODIMENTS

Figure 1:
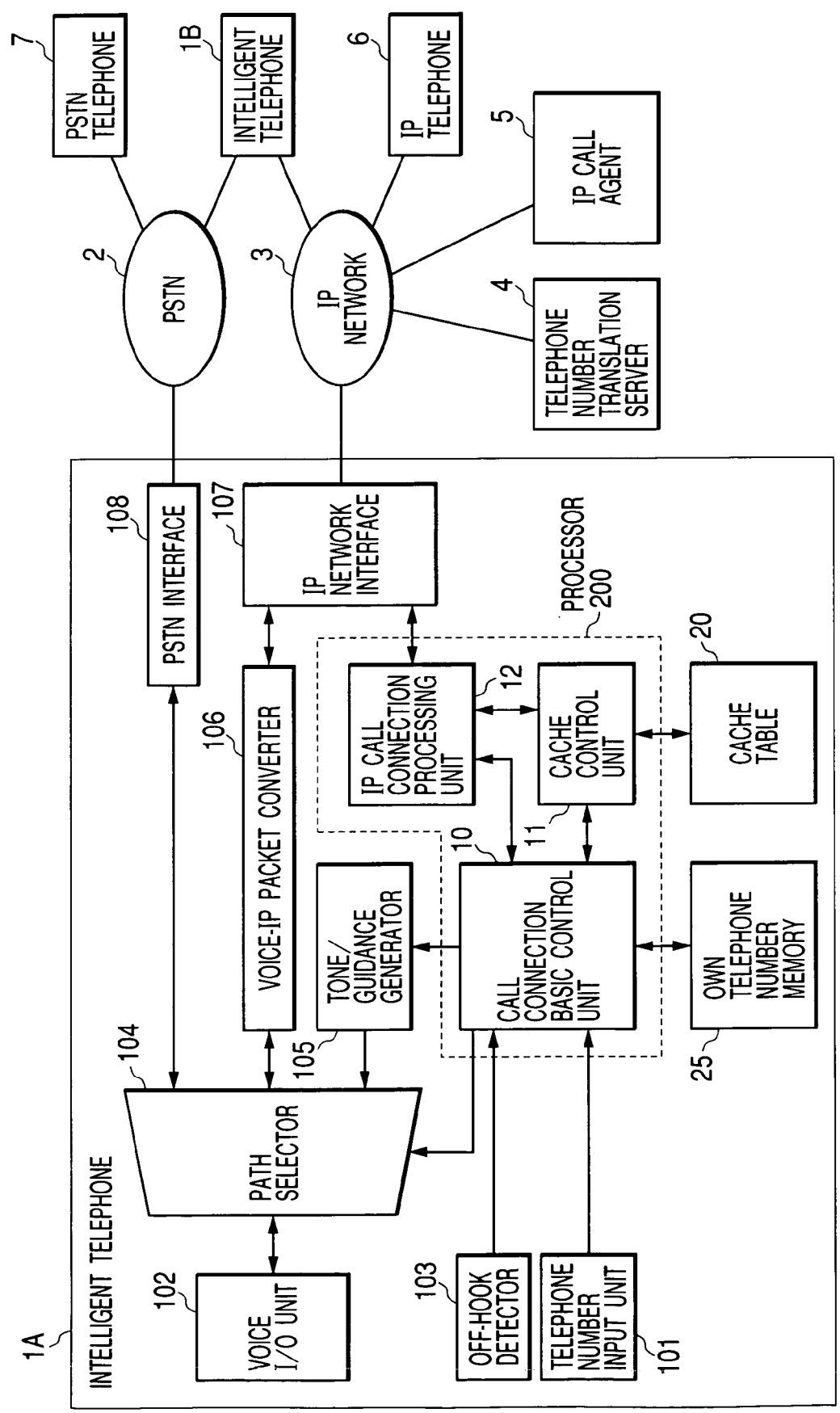
FIG. 1 is a functional block diagram of an intelligent telephone 1 according to the present invention and a schematic of network topology for call connection.

FIG. 1 shows a functional block diagram of a telephone applicable to PSTN and IP network (hereinafter referred to as an intelligent telephone) provided with a selective call connection function according to the present invention and network topology for call connection.

Intelligent telephones 1 (1A and 1B) each are connected to a PSTN 2 through a PSTN interface 108 and connected to an IP network 3 through an IP network interface 107. The PSTN 2 accommodates an ordinary telephone (PSTN telephone) 7 besides the intelligent telephones 1. To the IP network 3, as devices relevant to the present invention, a telephone number translation server 4 which stores mappings between PSTN telephone numbers and IP network telephone numbers, an IP call agent (control server) 5, and an IP telephone 6 are connected. The IP telephone 6 refers to a soft phone which is realized by software on a personal computer (PC) or a telephone dedicated to the IP network. In practical application, a great number of telephones of the above-mentioned types would be connected to the PSTN 2 and IP network 3.

The call agent 5 has a database of mappings between IP network telephone numbers and IP addresses and provides destination IP address information necessary for the IP telephony or effects call connection on the IP network in response to request from the IP telephone 6 or the intelligent telephones 1. In the following, description will be made, assuming that, for example, a gatekeeper compliant to ITU-T recommendation H.323 is applied as the above call agent 5.

The intelligent telephone 1 comprises a call connection basic control unit 10, a cache control unit 11, and an IP call connection processing unit 12 which are realized by software executed by a processor 200, a cache table 20 which is accessed by the above cache control unit 11, an own telephone number memory 25 in which the PSTN telephone number and IP network telephone number of the intelligent telephone 1 itself are stored. In the cache table 20, a plurality of entries of mappings between destination PSTN telephone numbers and IP network telephone numbers obtained from the telephone number translation server are stored.

Reference numeral 101 denotes a telephone number input unit, 102 denotes a voice I/O unit (a telephone transmitter and receiver), 103 denotes an off-hook detector, and 104 denotes a path selector. Under control from the call connection basic control unit 10, the path selector 104 selectively connects the voice I/O unit 102 to a tone/guidance generator 105, a voice-IP packet converter 106, or a PSTN interface 108.

The tone/guidance generator 105 generates telephone number tones for PSTN call connection and a tone or voice guidance to inform the user of call connection processing status transition such as e.g. during an inquiry for a destination IP network telephone number or discrimination between the IP network and PSTN via which call connection is made. The voice-IP packet converter 106 converts transmission voice signal from the voice I/O unit 102 into IP packets to send out the IP packets to the IP network interface 107 and coverts IP packets input from the IP network interface 107 into voice signals to output the voice signal to the voice I/O unit 102. Between the voice-IP packet converter 106 and the path selector 104, a voice coder/decoder (CODEC) such as e.g. G.729 is inserted, though it is omitted in FIG. 1.

The call connection basic control unit 10 starts call connection control in response to the input of a destination telephone number and activates the cache control unit 11 and the IP call connection processing unit 12 during the call control process. The IP call connection processing unit 12 is provided with functions to inquire of the telephone number translation server 4 for an IP network telephone number corresponding to the entered PSTN telephone number and to inquire of the call agent 5 for destination address information (IP address, etc.) corresponding to the IP network telephone number. In addition to the call connection control function, the call connection basic control unit 10 is provided with a function to register the telephone's own numbers (PSTN telephone number and IP network telephone number) to the telephone number translation server 4 via the IP call connection processing unit 12 periodically or when the intelligent telephone 1 is connected to the IP network.

For a protocol for communication between the above IP call connection processing unit 12 and the call agent 5, a general-purpose call control protocol such as e.g. H.323 is applied. A protocol for communication between the IP call connection processing unit 12 and the telephone number translation server 4 may be either above-mentioned general-purpose call control protocol or a uniquely selected protocol.

Figure 2:
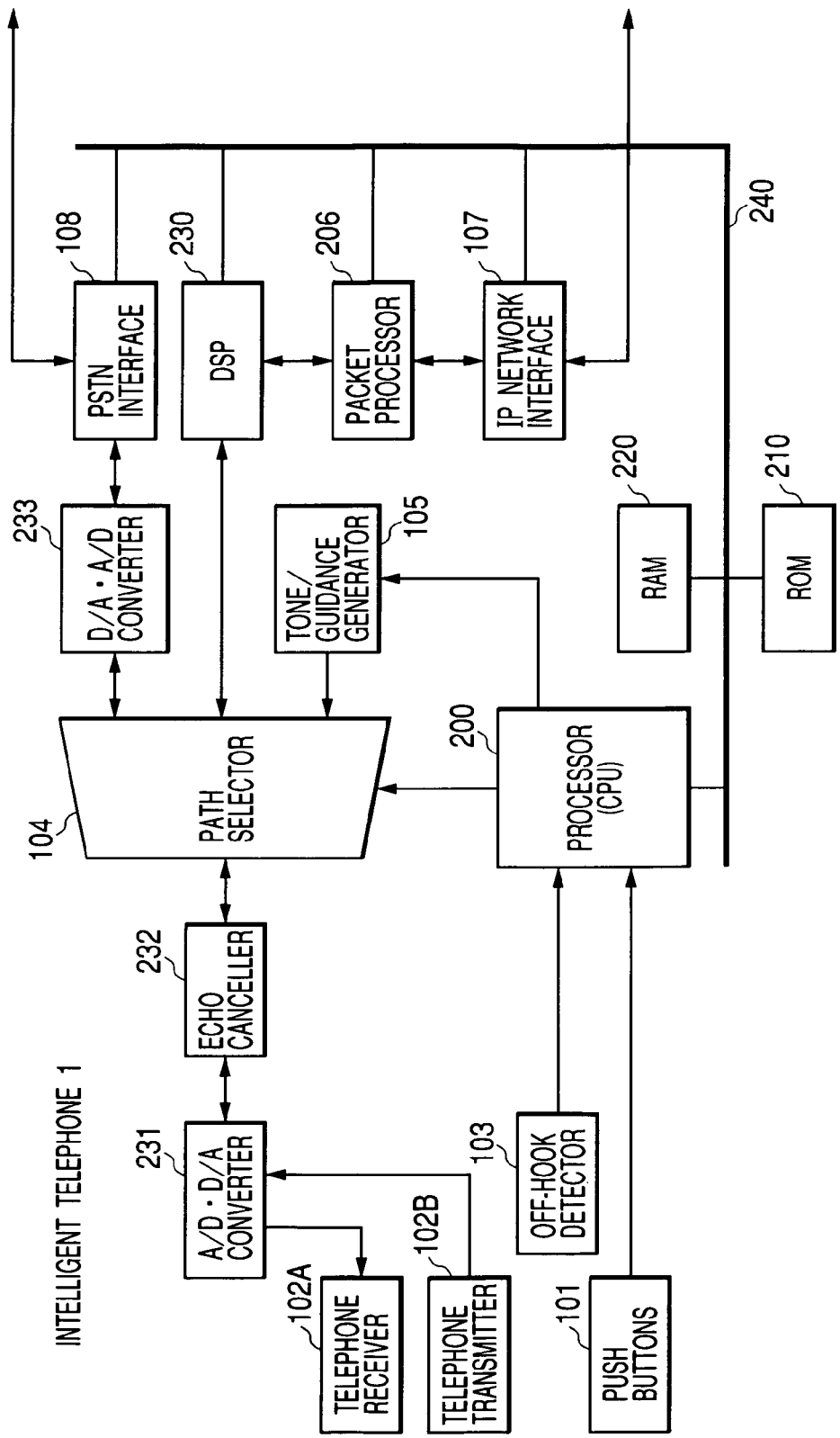
FIG. 2 is a diagram showing a hardware configuration example of the intelligent telephone 1.

FIG. 2 shows a hardware configuration example of the intelligent telephone.

The intelligent telephone 1 comprises a processor (CPU) 200 for performing overall control a ROM 210 in which several programs including programs for the above-mentioned call connection basic control unit 10, cache control unit 11, and IP call connection processing unit 12 are stored, a RAM 220 in which the above-mentioned cache table 20 and own telephone number memory 25 and the processor working area are created, a digital signal processor (DSP) 230 for performing voice processing such as voice encoding/decoding and voice compression, a packet processor 206, the IP network interface (MODEM) 107, and the PSTN interface (analog interface) 108. These components are interconnected by an internal bus 240. The function of the voice-IP packet converter 106 shown in FIG. 1 is realized by the above digital signal processor (DSP) 230 and packet processor 206.

The intelligent telephone 1 further comprises push buttons (or dials) which function as the telephone number input unit 101, a telephone receiver (speaker) 102A and a telephone transmitter (microphone) 102B which constitute the voice I/O unit 102, the off-hook detector 103 which detects on and off the hook of the telephone transmitter/receiver, the path selector 104 and tone/guidance generator 105 connected to the processor 200, an analog/digital (A/D) and digital/analog (D/A) converter 231 connected to the telephone transmitter and receiver 102A and 102B, an echo canceller 232 inserted between the A/D and D/A converter 231 and the selector 104, and an A/D and D/A converter 233 inserted between the selector 104 and the analog interface 108.

FIG. 3 shows an example of a telephone number translation database 40 held by the telephone number translation server 4.

The telephone number translation database 40 contains a plurality of entries 400-1, 400-2, . . . in which mappings of PSTN telephone number 41 and IP network telephone number 42 are registered. In the present embodiment, hold time (or entry valid period) 43 is also stored which indicates time elapsed since the registration of the telephone numbers and is referenced so that an entry for which a predetermined time has elapsed from the registration is deleted from the database.

Each entry of the telephone number translation database 40 is generated whenever the call connection basic control unit 10 on the intelligent telephone 1 periodically reads out the PSTN telephone number and IP network telephone number from the own telephone number memory 25 and transmits a telephone number registration message via the IP call connection processing unit 12 to the telephone number translation server 4. When the intelligent telephone 1 is disconnected from the IP network, the periodical telephone number registration procedure for the disconnected intelligent telephone is discontinued and, consequently, the entry for this intelligent telephone 1 is deleted from the database 40. Therefore, for an inquiry occurred during this period, any IP network telephone number is not returned, and, consequently, IP call connection to the above intelligent telephone 1 is disabled. However, when the intelligent telephone 1 is reconnected to the IP network, the periodical telephone number registration from the intelligent telephone 1 to the telephone number translation server 4 resumes and IP call connection becomes enabled again.

When the user of the intelligent telephone 1 enters a destination PSTN telephone number, for example, "03-9012-3456," an inquiry message for an IP network telephone number corresponding to the PSTN telephone number "03-9012-3456" is transmitted from the call connection basic control unit 10 via the IP call connection processing unit 12 to the telephone number translation server 4, as will be detailed later.

Upon having received the above IP network telephone number inquiry message, the telephone number translation server 4 searches the database 40 for an entry 400-1 having the PSTN telephone number "03-9012-3456" and returns a response message containing the IP network telephone number "050-789-0123" mapped to the above PSTN telephone number in that entry to the requesting intelligent telephone 1. Once having obtained the above IP network telephone number, the call originated from the intelligent telephone 1 becomes connectable via the IP network. If an entry having the PSTN telephone number "03-9012-3456" and its mapping inquired is not found in the database 40, the telephone number translation server 4 returns a response message that the objective IP network telephone number has not been registered to the requesting intelligent telephone 1.

Figure 4:
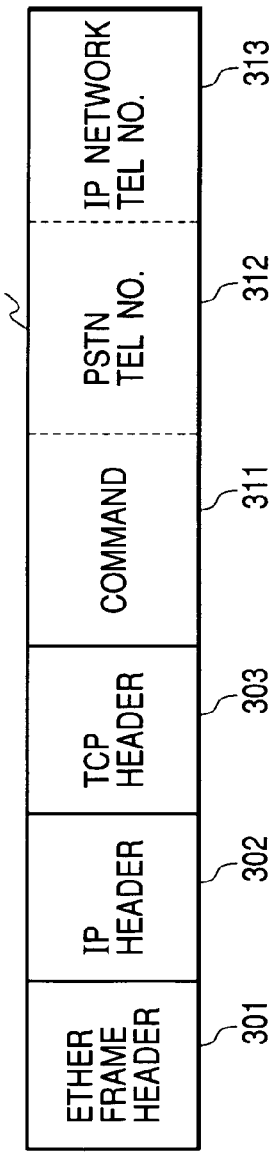
FIG. 4 shows a format example of a message to be transmitted from the intelligent telephone 1 to the telephone number translation server 4.

FIG. 4 shows a format example of the telephone number registration message and IP network telephone number inquiry message to be transmitted from the intelligent telephone 1 to the telephone number translation server 4.

The message 300T to be transmitted from the intelligent telephone 1 to the telephone number translation server 4 is composed of an Ether frame header 301 (Ethernet is a trademark of Xerox Corp.), an IP header 302, a TCP header 303, and a data field 310. The data field 310 is comprised of a command field 311, a PSTN TEL No. field 312, and an IP Network TEL No. field 313.

The telephone number registration message contains a registration command in the command field 311, the PSTN telephone number of the source intelligent telephone 1 in the PSTN TEL No. field 312, and the IP network telephone number of the source intelligent telephone in the IP Network TEL No. field 313. The IP network telephone number inquiry message contains an inquiry (or search) command in the command field 311 and the destination PSTN telephone number in the PSTN TEL No. field 312 with the IP Network TEL No. field 313 being null.

Figure 5:
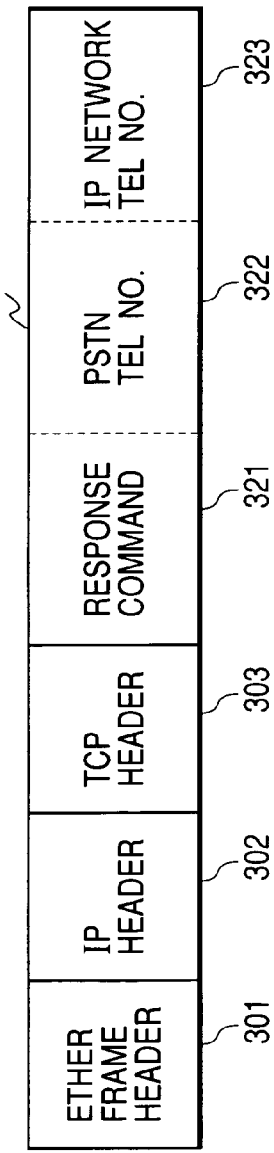
FIG. 5 shows a format example of a response message to be transmitted from the telephone number translation server 4 to the intelligent telephone 1.

FIG. 5 shows a format example of the response message to be transmitted from the telephone number translation server 4 to the intelligent telephone 1.

The response message 300R from the telephone number translation server 4 has the same structure as the message 300T and, therefore, is composed of the Ether frame header 301, IP header 302, TCP header 303, and data field 310. The data field 310 of the response message 300R is comprised of a command field 321, a PSTN TEL No. field 322, and an IP Network TEL No. field 323.

When having received the telephone number registration message from the intelligent telephone 1, the telephone number translation server 4 registers a new entry into the database 40 and returns a response message containing a response command which indicates the data registration completed in the command field 321 and the registered PSTN telephone number and IP network telephone number in the PSTN TEL No. field 322 and IP Network TEL No. field 323, respectively. If the data registration has failed for some reason, a response command indicating a registration error is set in the command field 321.

When having received the IP network telephone number inquiry message from the intelligent telephone 1, the telephone number translation server 4 returns a response message containing an inquiry response command in the command field 321, the PSTN telephone number whose mapping inquired in the PSTN TEL No. field 322, and the IP network telephone number mapped to the above PSTN telephone number and retrieved from the data base 40 in the IP Network TEL No. field 323. If the inquired IP network telephone number mapped to the PSTN telephone number has not been registered, the telephone number translation server 4 returns a response message containing an error response command in the command field 321 and the PSTN telephone number whose mapping inquired in the PSTN TEL No. field 322 with the IP Network TEL No. field 323 being null.

FIG. 6 shows a preferred embodiment example of the cache table 20 on the intelligent telephone 1.

The cache table 20 stores a plurality of entries EN-1, EN-2, . . . for mappings between destination PSTN telephone numbers and IP network telephone numbers obtained by past inquiry sessions with the telephone number translation server 4 in order to curtail time required for call connection processing. In this embodiment example, each entry in the cache table 20 specifies priority 21, PSTN TEL No. (22), IP Network TEL No. (23), the last calling time 24, total number of calls 25, and average call interval 26.

For example, when the user enters a PSTN telephone number "045-123-4567," if the IP telephone number entry corresponding to this telephone number has not been registered in the cache table 20, the intelligent telephone 1 transmits the IP network telephone number inquiry message to the telephone number translation server 4 and obtains a destination IP network telephone number "050-890-1234."

The call connection basic control unit 10 on the intelligent telephone 1 performs IP call connection processing, using the above IP network telephone number, and, if the call connection is completed successfully, then generates an entry EN-1 of the mapping between the IP network telephone number "050-890-1234" and the originated PSTN telephone number "045-123-4567," and registers this entry into the cache table 20. If the call connection to the above IP network telephone number "050-890-1234" is unsuccessful, then the call connection basic control unit 10 judges the IP network telephone number invalid and registers the entry with the IP Network TEL No. field 23 remaining empty into the cache table 20. If an error response to the IP network telephone number inquiry is returned from the telephone number translation server 4, then the call connection basic control unit 10 performs PSTN call connection processing and registers an entry with the IP Network TEL No. field 23 being null into the cache table 20.

Priority 21 is given to each entry in the cache table 20, for example, according to the average call interval 26 values calculated from the last calling time 24 and the total number of calls 25, so that the highest priority is given to an entry having the shortest average call interval. If the number of entries registered in the cache table 20 exceeds a predetermined maximum number K, an entry having the lowest priory 21 is deleted and a new entry is added.

Figure 7:
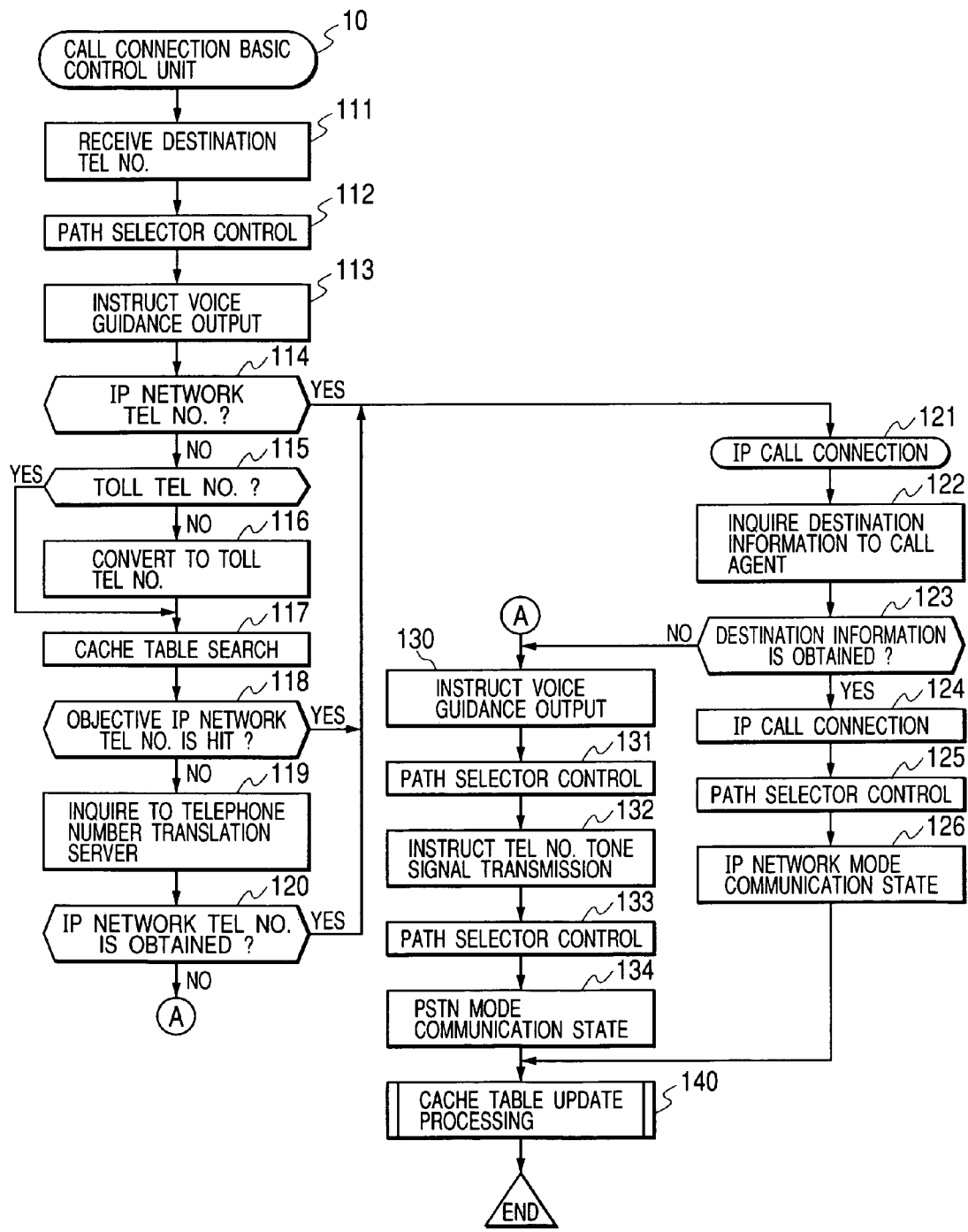
FIG. 7 is a program flowchart explaining the operation of a call connection basic control unit 10.

In order to ensure that the cache table contains valid entries, as will be detailed in FIG. 7, it is advisable that the cache control unit 11 periodically communicates with the telephone number translation server 4 and updates the contents of the cache table appropriately. As for a telephone whose IP network telephone number has not been registered, for example, as is the case for entry EN-(k-1) in which PSTN telephone number "0467-567-8901" is registered, since then, if its user subscribes the IP telephony service and is assigned an IP network telephone number, the above cache table update should add the IP network telephone number to the table entry. Consequently, the next time a call is made to the number "0467-567-8901," IP call connection can be completed speedily, using the IP network telephone number mapped to the PSTN telephone number in the cache table 20.

The value of average call interval 26 is updated at regular intervals or each time a call is made through calculation such as, e.g., using formula (1) Here ΔT is the value of average call interval at the present, N is the total number of calls at the present, Tc is time at the present, and Ts is the last calling time at the present.

$$\text{Average call interval} = (\Delta T \times (N-1) + Tc - Ts)/N \quad (1)$$

Here, except for the entry or entries for which the total number of calls N is updated by a new call, average call interval should be maintained to the value ΔT during period Tc−Ts<ΔT.

FIG. 7 shows a program flowchart explaining the operation of the call connection basic control unit 10 according to a preferred embodiment of the invention.

Upon receiving a destination telephone number entered by the calling user (step 111), the call connection basic control unit 10 controls the path selector 104 to connect the voice I/O unit 112 to the tone/guidance generator 105 (112) and instructs the tone/guidance generator 105 to send out voice guidance indicating that a call connection procedure is being executed now (113). The call connection basic control unit 10 analyzes the telephone number entered by the user and judges whether the destination telephone number is IP network telephone number or PSTN telephone number, subject to whether or not the first three digits of the number are "050," for example (114). If the destination telephone number is IP network telephone number, the control unit 10 makes the IP call connection processing unit 12 start IP call connection processing 121.

If the destination telephone number is PSTN telephone number, the call connection basic control unit 10 judges whether the above telephone number includes a toll number (115). If the destination telephone number includes a toll number, the control unit 10 activates the cache control unit 11 and, then, the cache control unit 11 searches the cache table 20 for an IP network telephone number corresponding to the destination PSTN telephone number (117). If the objective IP network telephone number is hit by searching the cache table 20 (118), the call connection basic control unit 10 makes the IP call connection processing unit 12 start IP call connection processing 121, based on the above IP network telephone number.

Unless the objective IP network telephone number is hit by searching the cache table 20, the call connection basic control unit 10 instructs the IP call connection processing unit 12 to inquire of the telephone number translation server 4 for an IP network telephone number corresponding to the destination PSTN telephone number (119) and waits for a response from the telephone number translation server 4. Upon judgment by the response from the telephone number translation server 4 (120), if the IP network telephone number is obtained, the call connection basic control unit 10 makes the IP call connection processing unit 12 start IP call connection processing 121, based on the above IP network telephone number.

At step 115, if the destination telephone number does not include a toll number, that is, if the user entered the destination telephone number consisting entirely of local exchange code and subscriber number, the call connection basic control unit 10 adds "0" and "toll number" retrieved from the own telephone number memory 25 to the head of the above destination telephone number (116), thus converting it into a numbering format including a toll number, and performs step 117 and subsequent, using the converted number. This is because the telephone number translation server 4 connected to the wide-area IP network 3 registers PSTN telephone numbers 41 in the telephone numbering format of "0"+"toll number"+"local exchange code"+"subscriber number" on the database 40.

In the IP call connection processing 121, the IP call connection processing unit 12 inquires of the IP call agent 5 for destination address information (IP address, etc.) corresponding to the IP network telephone number (122). Upon judgment by the response from the IP call agent 5 (123), if the destination address information is obtained, the IP call connection processing unit 12 executes an IP call connection procedure (124) to establish call connection between the calling intelligent telephone and the destination IP telephone and notifies the call connection basic control unit 10 of call connection complete. If the destination address information cannot be obtained, the IP call connection processing unit 12 notifies the call connection basic control unit 10 that the destination IP address cannot be obtained without executing the IP call connection procedure.

Upon receiving the notification of IP call connection complete from the IP call connection processing unit 12, the call connection basic control unit 10 controls the path selector 104 to connect the voice I/O unit 102 to the analog voice-IP packet converter 106 (DSP 230 and packet processor 206) (125) and, then, the calling intelligent telephone is put in an IP network mode connection state (126).

If the destination address information cannot be obtained from the IP call agent 5 or if the IP network telephone number cannot be obtained from the telephone number translation server 4, the call connection basic control unit 10 instructs the tone/guidance generator 105 to send out guidance indicating that PSTN connection mode is selected (130). After that, the call connection basic control unit 10 controls the path selector 104 to connect the tone/guidance generator 105 to the voice I/O unit 102 and the PSTN interface 108 (131), and instructs the tone/guidance generator 105 to send out the tone signals of the PSTN telephone number (132). Thereby, the tone signals representing the above PSTN telephone number are sent out to the PSTN 2 and a PSTN call connection procedure is performed.

Upon the completion of the PSTN call connection, the call connection basic control unit 10 controls the path selector 104 to disconnect the tone/guidance generator 105 from the voice I/O unit 102 and connect the voice I/O unit to the PSTN interface 108 (133), and, then, the calling intelligent telephone is put in a PSTN mode communication state (134).

Upon the completion of the above IP or PSTN call connection processing, the call connection basic control unit 10 instructs the cache control unit to update the cache table 20 by designating the destination telephone number (PSTN telephone number or IP network telephone number), the result of the inquiry made to the telephone number translation server 4, the result of call connection, and other accompanying information to the cache control unit (140).

Figure 8:
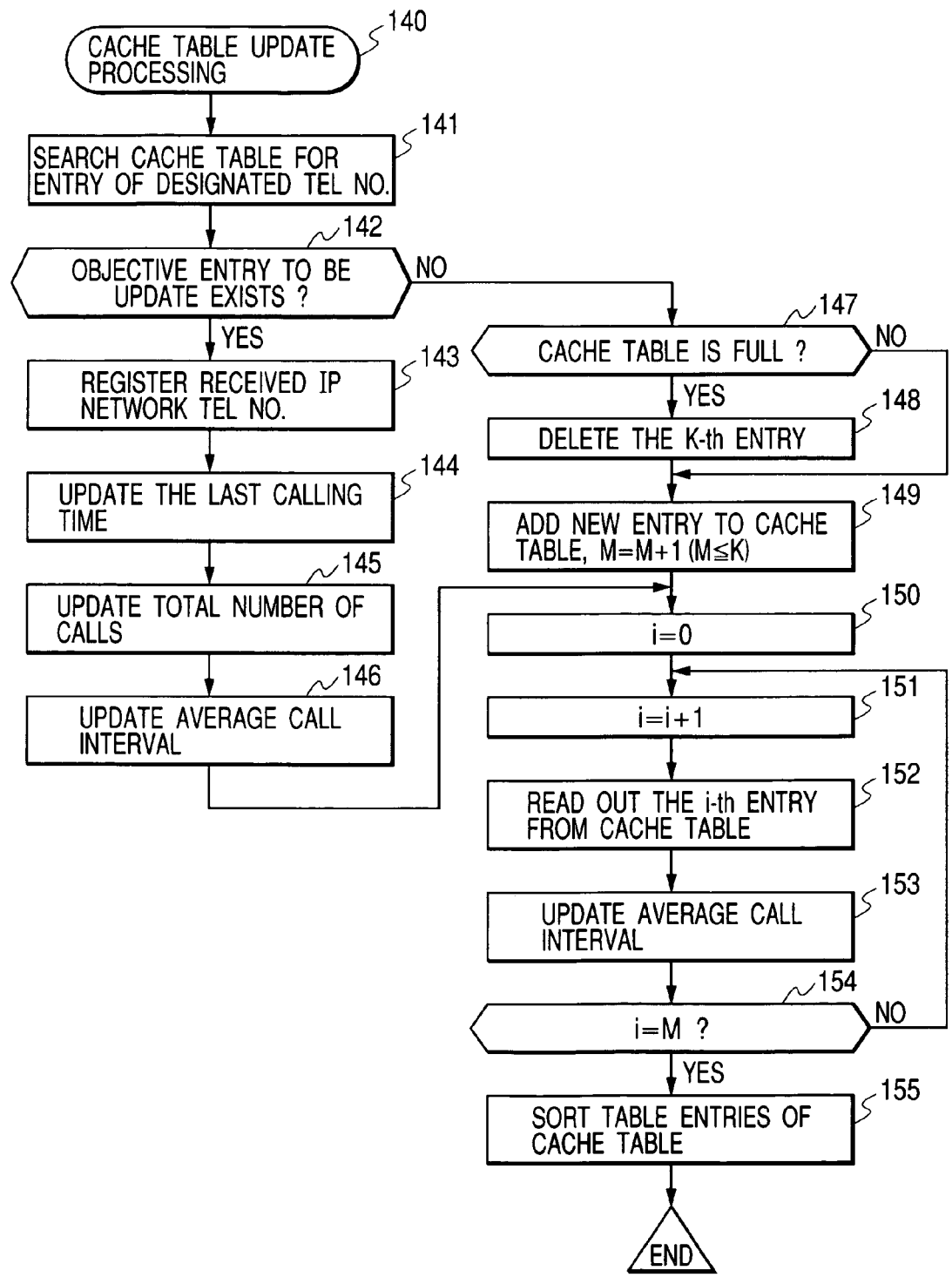
FIG. 8 is a program flowchart of cache table update processing 140 to be performed by a cache control unit 11.

FIG. 8 is a flowchart of update processing 140 of the cache table 20 to be performed by the cache control unit 11 in response to the update instruction from the call connection basic control unit 10.

Upon having received the instruction to update cache table 20 from the call connection basic control unit 10, the cache control unit 11 searches the cache table 20 for an entry including the telephone number designated by the call connection basic control unit 10 (step 141).

As the result of the table search, if an entry including the designated telephone number exists in the cache table 20, and if the IP Network TEL No. field 23 of the entry is null or if the IP network telephone number registered in this field differs from the designated number (142), the cache control unit registers the IP network telephone number designated by the call connection basic control unit 10 (143). Then, the cache control unit updates the last calling time 24 to the present time (144) increments the total number of calls 25 (145), updates the average call interval (146) to a value calculated, according to the formula (1), and performs average call interval calculation and priority update for all entries (150).

If an entry including the above designated telephone number is not registered in the cache table 20, the cache control unit judges whether the number M of entries registered in the cache table 20 equals the maximum number K (147). If the number of the entries equals the maximum number, the cache control unit deletes the k-th entry that is of the lowest priority from the table to secure space area (148). If the number M of the registered entries is less than the maximum number K, using space area in the (M+1)-th position, the cache control unit adds a new entry of mapping between the PSTN telephone number and IP network telephone number, designated by the call connection basic control unit 10, to the cache table 20 and increments the number M of the registered entries (where M≦K) (149). At this time, the cache control unit sets the present time in the last calling time 24 field, a value of "1" in the total number of calls 25 field, and a value of "0" in the average call interval 26 field.

Next, the cache control unit executes average call interval calculation. The cache control unit first initializes the value of parameter i that represents a table entry of interest to 0 (150) and increments the value of parameter i (151). The cache control unit reads out the i-th entry EN-i from the cache table 20 (152), calculates a new value of average call interval by substituting the values of the last calling time 24, total number of calls 25, and average call interval 26 for Ts, N and ΔT of formula (1), and updates the value of the average call interval 26 (153). The cache control unit compares the value of the parameter i with the number M of the registered entries (154) and, unless i=M, returns to step 151 and repeats the foregoing operation for the next entry.

Upon the completion of updating the average call interval for all registered entries, the cache control unit rearranges the table entries in order of the average call interval 26 and updates the priority 21 (155), then this routine terminates.

Figure 9:
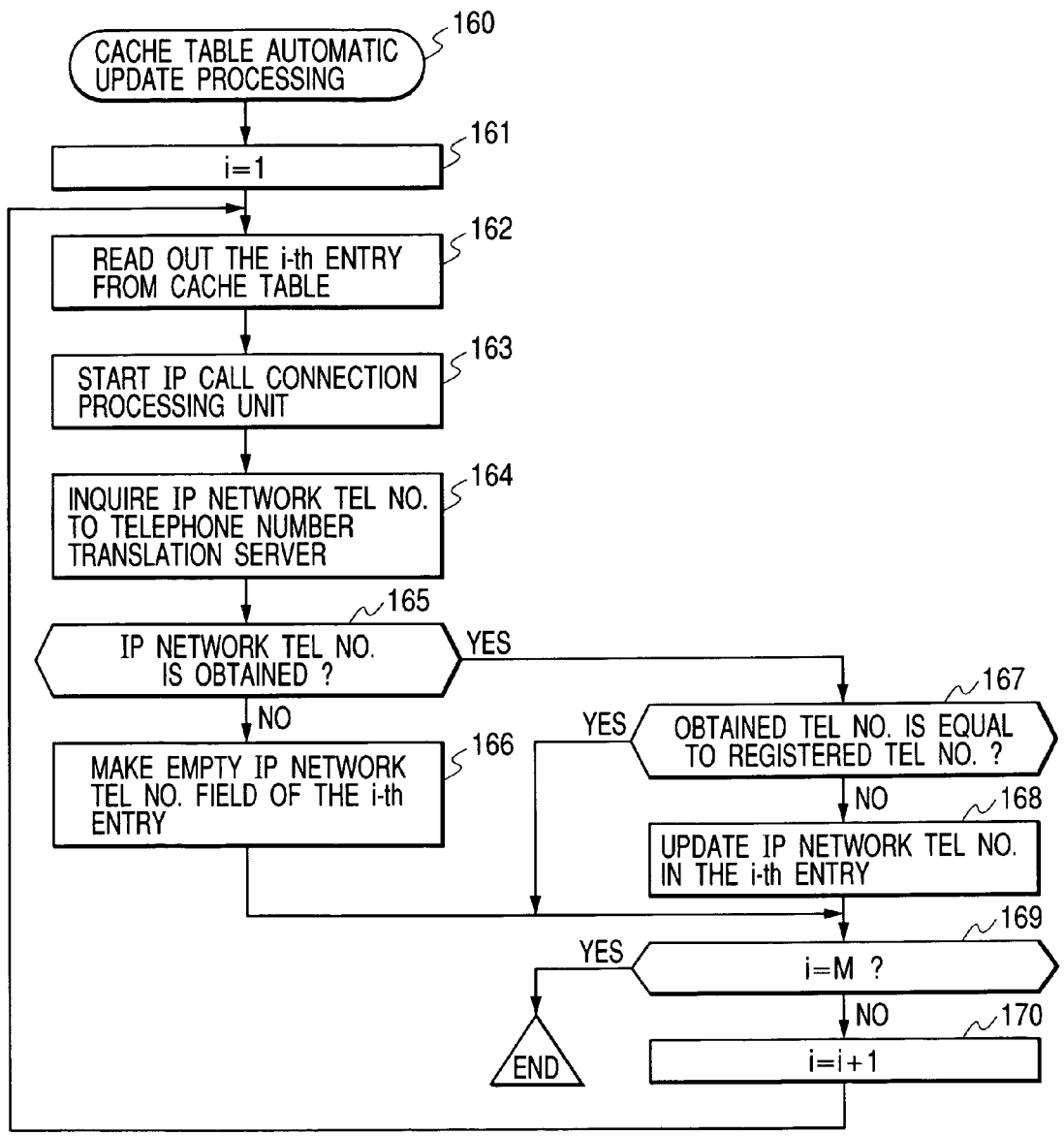
FIG. 9 is a program flowchart of automatic cache table update processing 160 to be performed periodically by the cache control unit 11.

FIG. 9 shows a flowchart of automatic cache table update processing 160 to be performed periodically by the cache control unit 11.

The automatic cache table update processing 160 is activated periodically by, for example, a timer interrupt or the like. After initializing the value of parameter i that represents a table entry of interest to 1 (161), the cache control unit reads out the i-th entry from the cache table (162), activates the IP call connection processing 12 (163), and makes the IP call connection processing unit 12 inquire of the telephone number translation server 4 for an IP network telephone number corresponding to the PSTN telephone number 21 (164).

Upon judgment by the response to the inquiry returned from the IP call connection processing unit 12 (165), if the IP network telephone number corresponding to the designated PSTN telephone number cannot be obtained from the telephone number translation server 4, the cache control unit leaves the IP Network TEL No. field 23 empty in the i-th entry of the cache table 20 (166) and compares the value of parameter i with the number M of the entries registered in the cache table 20 (169). If the value of the parameter i equals the number M of the registered entries, this routine terminates. If not, the cache control unit increments the value of parameter i (170), returns to step 162, and repeats the same operation.

At step 165, if the IP network telephone number corresponding to the designated PSTN telephone number is obtained from the telephone number translation server 4, the cache control unit compares the IP network telephone number with the IP network telephone number existing in the IP Network TEL No. field 23 in the i-th entry of the cache table 20 (167). If there is a match between the IP network telephone numbers, the cache control unit executes step 169. If there is a mismatch between the above IP network telephone numbers, the cache control unit updates the content of the IP Network TEL No. field 23 in the i-th entry to the new IP network telephone number (168) and executes step 169.

By carrying out the foregoing automatic cache table update processing 160, the IP network telephone number assigned to a user who has newly subscribed the IP telephony service can be obtained automatically from the telephone number translation server 4 and registered into the cache table 20 beforehand. Accordingly, this update increases the possibility that IP call connection can be completed without making an inquiry to the telephone number translation server 4 for a call originated by the user. Also, the IP network telephone number of a user disengaged from the IP network can be deleted from the cache table 20.

While the automatic cache table update processing 160 is carried out periodically in the above-described embodiment example, it may also be preferable in some implementation to carry out the automatic cache table update cyclically at all times except during a period when call connection processing is performed after the user originates a call by modifying the flowchart of FIG. 9 such that the process returns to step 161 whenever the value of parameter i has become equal to the number M of the registered entries at step 169.

Figure 10:
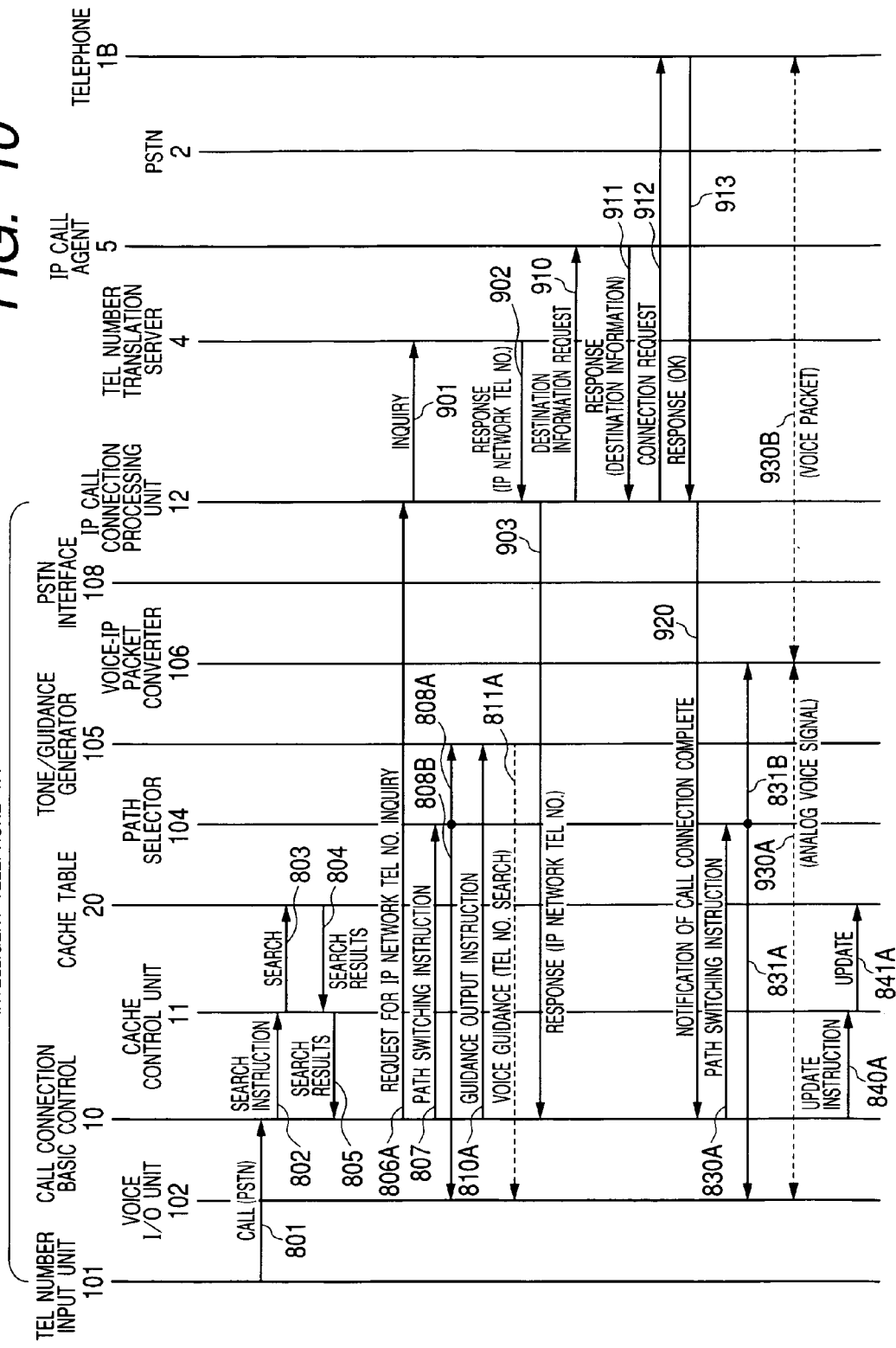
FIG. 10 is a diagram of one example of call connection sequence in the telephone system of the present invention.

FIG. 10 shows one example of call connection sequence in a scenario where the user of the intelligent telephone 1A enters the PSTN telephone number of the intelligent telephone 1B and the IP network telephone number of the destination telephone 1B is obtained from the telephone number translation server 4.

When the calling user enters the PSTN telephone number through the telephone number input unit 101 (801), the call connection basic control unit 10 instructs, with designation of the above PSTN telephone number, the cache control unit 11 to search for its corresponding IP network destination number (802). The cache control unit 11 searches the cache table 20 for an entry corresponding to the above PSTN telephone number (803) and returns search results (804) to the call connection basic control unit 10 (805). In this example, it is assumed that the IP network telephone number corresponding to the designated PSTN telephone number does not exist in the cache table 20.

The call connection basic control unit 10 that failed to obtain the IP network telephone number requests, with designation of the above PSTN telephone number, the IP call connection processing unit 12 to inquire of the telephone number translation server 4 for the IP network telephone number (806A), issues to the path selector 104 a path switching instruction (807) to connect the tone/guidance generator 105 to the voice I/O unit 102, and instructs the tone/guidance generator 105 to generate guidance (810A) indicating that IP network telephone number search is being executed.

When having received the IP network telephone number inquiry request (806A), the IP call connection processing unit 12 transmits an inquiry request message (901) to inquire of the telephone number translation server 4 for the IP network telephone number corresponding to the designated PSTN telephone number, and waits for a response from the telephone number translation server 4. At the same time, the path selector 104 connects the tone/guidance generator 105 to the voice I/O unit 102 (808A, 808B) in response to the path switching request (807), and the tone/guidance generator 105 generates a tone or voice guidance indicating that IP network telephone number search is being executed (811A) in response to the guidance output instruction (810A). The above tone or voice guidance is output via the path selector 104 to the voice I/O unit 102.

Upon having received a response message (902) in reply to the inquiry request (901) from the telephone number translation server 4, the IP call connection processing unit 12 notifies the call connection basic control unit 10 of the contents of the response message (903). In this example, it is assumed that the response message (902) contains the IP network telephone number corresponding to the designated PSTN telephone number.

In this case, the IP call connection processing unit 12 transmits a request message (910), with designation of the IP network telephone number extracted from the response message, for requesting destination IP information (IP address, etc.) of the destination intelligent telephone 1B to the IP call agent 5 according to H.323 protocol sequence. Upon having received a response message containing the destination IP information (911) from the IP call agent 5, the IP call connection processing unit 12 transmits a call connection request message (912) to the destination intelligent telephone 1B, using the received destination IP information. Upon having received a response message indicating call connection acknowledge (913) from the destination intelligent telephone 1B, the IP call connection processing unit 12 notifies the call connection basic control unit 10 of call connection complete (920).

When the call connection basic control unit 10 receives the notification of call connection complete (920) from the IP call connection processing unit 12, it issues to the path selector 104 a path switching instruction (830A) to connect the voice I/O unit 102 to the analog voice-IP packet converter 106. In response to the above path switching instruction, the path selector 104 connects the voice I/O unit 102 to the analog voice-IP packet converter 106 (831A, 831B). Then, the calling intelligent telephone is put in the IP network mode connection state (930A, 930B) in which the voice I/O unit 102 is connected to the destination intelligent telephone 1B through the IP network interface 107. In this state, analog voice input through the voice I/O unit 102 is transmitted to the destination intelligent telephone 1B after converted into voice packets by the analog voice-IP packet converter 106 and, in the reverse direction, voice packets received from the destination intelligent telephone 1B are converted into analog voice by the above analog voice-IP packet converter 106 and the analog voice is output through the voice I/O unit 102.

The call connection basic control unit 10 instructs, with designation of the PSTN telephone number and IP network telephone number relevant to the present call connection and accompanying information stating the successful IP call connection, the cache control unit 11 to update the cache table (add a new entry) (840A) as the final step of the call connection sequence. In response to the update instruction, the cache control unit 11 executes the cache table update processing 140 described in FIG. 8 and registers a new entry into the cache table 20 (841A).

Figure 11:
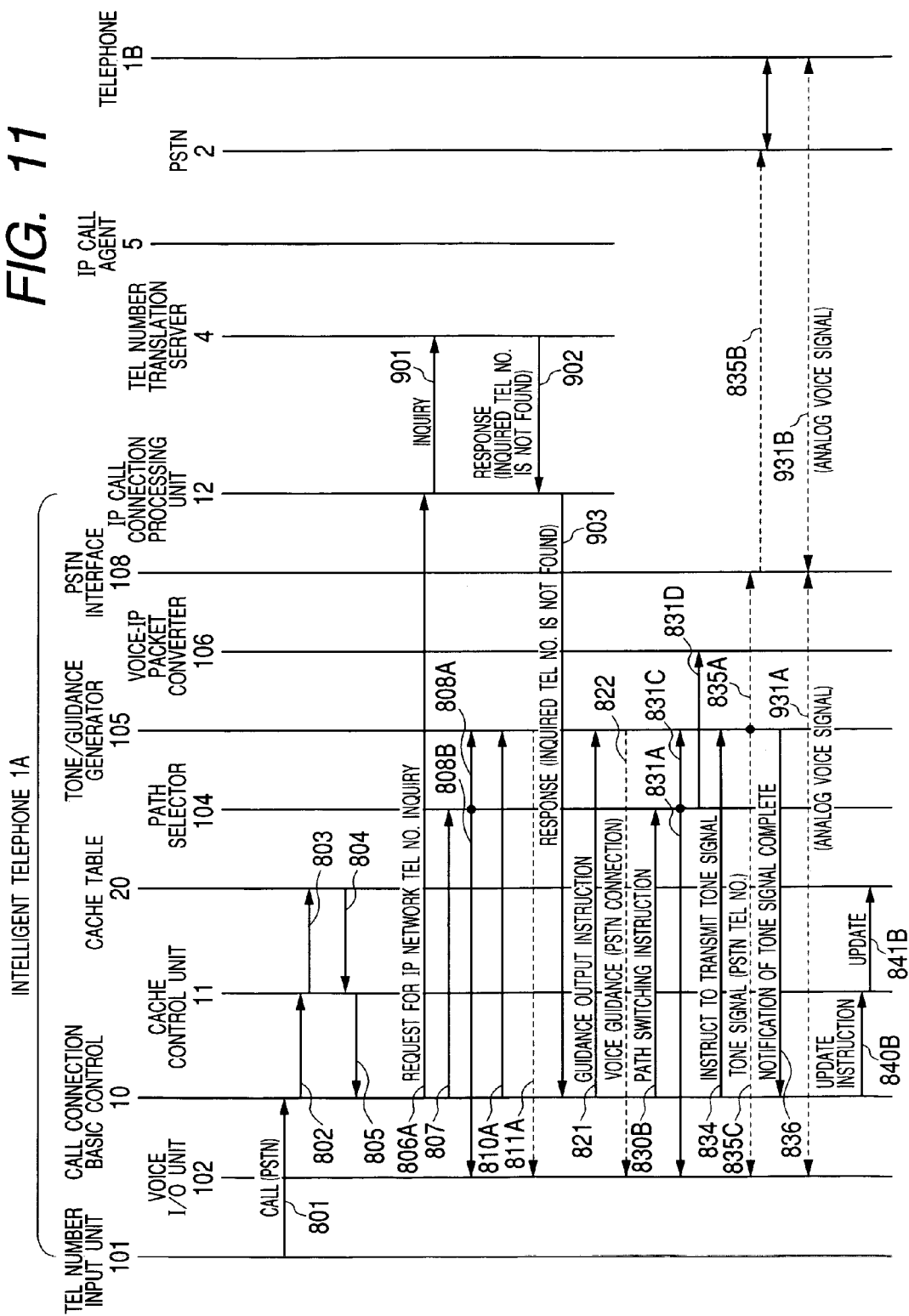
FIG. 11 is a diagram of another example of call connection sequence in the telephone system of the present invention.

FIG. 11 shows another example of call connection sequence in a scenario where the user of the intelligent telephone 1A enters the PSTN telephone number of the ordinary telephone 7 which is not the type applicable to both the PSTN and IP network and the IP network telephone number of the destination telephone cannot be obtained from the telephone number translation server 4.

The sequence from originating a call (801) up to guidance output (811A) is the same as described for FIG. 10. In this example, it is assumed that, in reply to the inquire request (901) from the IP call connection processing unit 12, the telephone number translation server 4 returns a response message (902) that the objective IP network telephone number is not found. In this case, when the IP call connection processing unit 12 notifies the call connection basic control unit 10 of the contents of the response (the objective IP network telephone number is not found) (903), the call connection basic control unit 10 instructs the tone/guidance generator 105 to generate guidance indicating that PSTN call connection is in process (821) and a tone or voice guidance indicating that PSTN call connection is in process, generated by the tone/guidance generator 105, is output to the voice I/O unit 102 (822).

After the output of the guidance indicating that PSTN call connection is in process, the call connection basic control unit 10 issues to the path selector 104 a path switching instruction (830B) to connect the voice I/O unit 102 and the tone/guidance generator 105 to the PSTN interface 108, and instructs, with designation of the PSTN telephone number, the tone/guidance generator 105 to send out dial tones (834).

In response to the above path switching instruction (830B), the path selector 104 connects the voice I/O unit 102 and the tone/guidance generator 105 to the PSTN interface 108 (831A, 831C, 831D). In response to the above instruction to transmit dial tones, the tone/guidance generator 105 generates dial tones representing the designated PSTN telephone number. The above dial tones are transmitted through the PSTN interface 108 to the PSTN 2 (835A, 835B) and the generated dial tones are also output through the voice I/O unit 102 (835C) so the user can hear the tones.

By transmitting the dial tones (835B) to the PSTN 2, call connection control processing is initiated and performed, according to call connection sequence in the PSTN and the calling intelligent telephone 1A is put in the PSTN mode communication state in which the voice I/O unit 102 is connected to the destination telephone through the PSTN interface 108 (931A, 931B). In this state, analog voice input and output through the voice I/O unit 102 is transferred over the PSTN in analog voice signal form.

As is the case for the sequence shown in FIG. 10, the call connection basic control unit 10 instructs the cache control unit 11 to update the cache table (add a new entry) (840B) as the final step of the call connection sequence, and the cache control unit 11 executes the cache table update processing 140 described in FIG. 8 (841B). In this case, the IP Network TEL No. field 23 remains empty in the registered or updated entry of the cache table 20.

When the tone or voice guidance indicating PSTN call connection being in process is generated from the voice I/O unit 101 (822), if the user puts the transmitter/receiver on the hook, as the user may do not want call connection via the PSTN, the call connection basic control unit 10 detects that the transmitter/receiver has become on the hook by change in the output from the off-hook detector 103 and aborts the call connection sequence.

Figure 12:
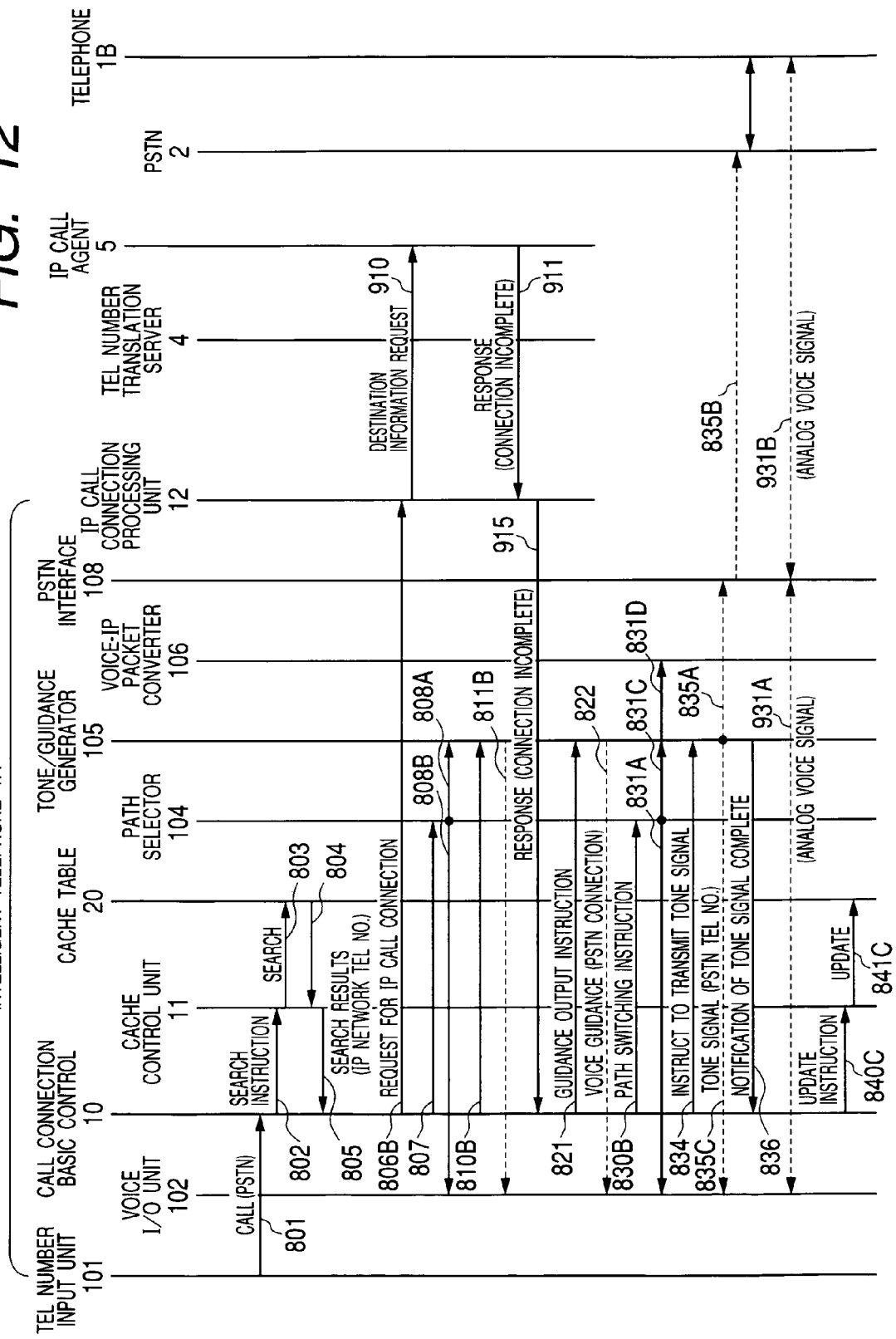
FIG. 12 is a diagram of a further another example of call connection sequence in the telephone system of the present invention.

FIG. 12 shows a further example of call connection sequence in a scenario where the user of the intelligent telephone 1A enters the PSTN telephone number of the intelligent telephone 1B and request for the destination IP information is issued to the call agent 5, using the IP network telephone number stored beforehand in the cache table 2. In this example, it is assumed, as an uncommon case, that a response message indicating that IP call connection is disabled is returned from the call agent 5.

When the PSTN telephone number is entered through the telephone number input unit 101 (801) the call connection basic control unit 10 instructs, with designation of the PSTN telephone number, the cache control unit 11 to search for its corresponding IP network telephone number (802). The cache control unit 11 searches the cache table 20 for an entry corresponding to the PSTN telephone number (803) and returns search results (804) to the call connection basic control unit 10 (805). In this example, it is assumed that the IP network telephone number corresponding to the designated PSTN telephone number has been registered in the cache table 20.

In this case, the step of making inquiry (901) to the telephone number translation server 4 is skipped, and the call connection basic control unit 10 requests, with designation of the IP network telephone number, the IP call connection processing unit 12 to setup IP call connection (806B). After that, as is the case for the sequence shown in FIG. 10, the call connection basic control unit 10 issues to the path selector 104 a path switching instruction (807) to connect the tone/guidance generator 105 to the voice I/O unit 102, and instructs the tone/guidance generator 105 to generate guidance (810B) indicating that IP call connection is in process.

Upon having received the request for IP call connection (806B), the IP call connection processing unit 12 transmits the request message (910), with designation of the IP network telephone number, for requesting destination IP information to the IP call agent 5, and waits for a response from the IP call agent. The path selector 104 connects the tone/guidance generator 105 to the voice I/O unit 102 (808A, 808B) in response to the path switching request (807) and the tone/guidance generator 105 generates a tone or voice guidance indicating that IP call connection is in process (811B) in response to the guidance output instruction (810B).

When the IP call connection processing unit 12 receives from the IP call agent 5 a response message (911) indicating that IP call connection is disabled for some reason, e.g., destination IP information is not found or the destination telephone is busy, it notifies the call connection basic control unit 10 that IP call connection is disabled (915). In this case, subsequent IP call connection control processing (912, 913) in accordance with the H.323 protocol sequence is aborted.

Upon having received the above notification that IP call connection is disabled from the IP call connection processing unit 12, the call connection basic control unit 10 changes over call control from IP call connection to PSTN call connection and caries out the same sequence as steps 821 through 834 in FIG. 11. Thereby, call connection in accordance with PSTN call connection sequence is performed, and the calling intelligent telephone 1A is put in the PSTN mode communication state in which the voice I/O unit 102 is connected to the destination telephone through the PSTN interface 108 (931A, 931B).

The call connection basic control unit 10 instructs the cache control unit 11 to update the cache table (840C) as the final step of the call connection sequence and the cache control unit 11 executes the cache table update processing 140 described in FIG. 8 (841C). In this case, the data in the relevant entry having been registered beforehand in the cache table 20 is updated.

As is obvious, if an ordinary response message containing destination IP information is received from the IP call agent 5 at step 911 in the above sequence example, steps 912 through 920 and steps 830A through 831B in FIG. 10 are carried out and, consequently, communication by IP call connection is realized.

While the above-described embodiment assumes that the gatekeeper compliant to ITU-T recommendation H.323 is applied as the IP call agent 5, a server provided with Session Initiation Protocol (SIP) functions recommended by the Internet Engineering Task Force (IETF) as a session control protocol for IP multimedia communication may be applied as the call control server 5. Because of high expandability of its functions, the SIP draws attention as a VOIP session control protocol.

SIP servers use Unification Resource Identifiers (SIP-URIs) to identify terminals. For example, when a SIP server receives from a calling terminal a session setup request (SIP-INVITE message) in which a destination terminal is identified by its SIP-URI, the SIP server transfers the received message to the destination terminal (or a home agent). By transferring a response message from the destination terminal to the calling terminal and an ACK message from the calling terminal to the destination terminal, the SIP server sets up a session between the calling terminal and the destination terminal.

If the SIP server is applied as the IP call agent 5, therefore, the telephone number translation server 4 should store the mappings between PSTN telephone numbers and SIP-URIs instead of the mappings between PSTN telephone numbers and IP-network telephone numbers. When an inquiry request in which a PSTN telephone number is designated is received from the calling intelligent telephone, the telephone number translation server 4 may return the SIP-URI corresponding to the designated PSTN telephone number to the calling intelligent telephone. Thus, the calling intelligent telephone can request the IP call agent 5 for IP address information for call connection (session setup) by designating the destination telephone's SIP-URI and, consequently, communication on the IP network between the calling telephone and the destination telephone with the SIP-URI can be realized. In this case, in the cache table 20 on the intelligent telephones, SIP-URIs are stored instead of IP network telephone numbers 23 as the unification identifiers of destination telephones.

As is obvious from the foregoing descriptions, according to the present invention, a mutual communication though the IP network among IP telephony service subscribers can be realized simply by entering a destination PSTN telephone number even if the calling user does not know the IP network telephone number of the called user. Thus, telephony service at low telephone charges can be provided to IP telephony service subscribers. As for special numbers such as international telephone numbers, "0120," etc., call connection through the IP network becomes possible if such a PSTN telephone number and its corresponding IP network telephone number are mapped and stored beforehand on the telephone number translation server.

What is claimed is:

1. A telephone applicable to a public switched telephone network (PSTN) and an Internet Protocol (IP) network, comprising:
   a first interface for transmitting and receiving analog signals over the PSTN;
   a second interface for transmitting and receiving packet data over the IP network;
   means for communicating with a telephone number translation server connected to the IP network through said second interface when a call is originated by entering a PSTN telephone number and obtaining from the telephone number translation server an IP network telephone number of a destination telephone corresponding to the PSTN telephone number;
   means for communicating with a call agent connected to the IP network through said second interface to obtain IP address information of the destination telephone corresponding to said IP network telephone number, and establishing a call connection with the destination telephone via the IP network by using the IP address information; and
   means for establishing a call connection with the destination telephone via the PSTN through said first interface if the IP network telephone number of the destination telephone corresponding to said PSTN telephone number cannot be obtained from said telephone number translation server.

2. The telephone according to claim 1, further comprising means for communicating with said telephone number translation server and registering a mapping of the telephone's own PSTN telephone number and IP network telephone number to the server when the telephone is connected to the IP network.

3. The telephone according to claim 1, wherein, if the entered PSTN telephone number comprises entirely of local exchange code and subscriber number, said means for obtaining the IP network telephone number converts the entered PSTN telephone number into a numbering format including a toll number prior to obtaining the IP network telephone number of the destination telephone.

4. A call connection control method for connecting a calling telephone, which is connected to a public switched telephone network (PSTN) and an Internet Protocol (IP) network, to a destination telephone, comprising the steps of:
   communicating with a telephone number translation server connected to the IP network when a call is originated by entering a PSTN telephone number and obtaining from the telephone number translation server an IP network telephone number of the destination telephone corresponding to said PSTN telephone number;
   obtaining IP address information of the destination telephone corresponding to said IP network telephone number from a call agent connected to said IP network and establishing a call connection between the calling telephone and the destination telephone via the IP network by using the IP address information; and
   establishing a call connection between the calling telephone and the destination telephone via the PSTN if the IP network telephone number of the destination telephone corresponding to said PSTN telephone number cannot be obtained from said telephone number translation server.

5. The call connection control method according to claim 4, further comprising the step of storing a mapping between the IP network telephone number obtained from said telephone number translation server and said PSTN telephone number into a cache table,
   wherein when a call is originated by entering a PSTN telephone number, said cache table is searched for the IP network telephone number of the destination telephone corresponding to the entered PSTN telephone number, and if the IP network telephone number of the destination telephone exists in the cache table, the IP network telephone number is used, and if the IP network telephone number of the destination telephone does not exist in the cache table, the IP network telephone number of the destination telephone is obtained from said telephone number translation server.

* * * * *